Patented May 9, 1933

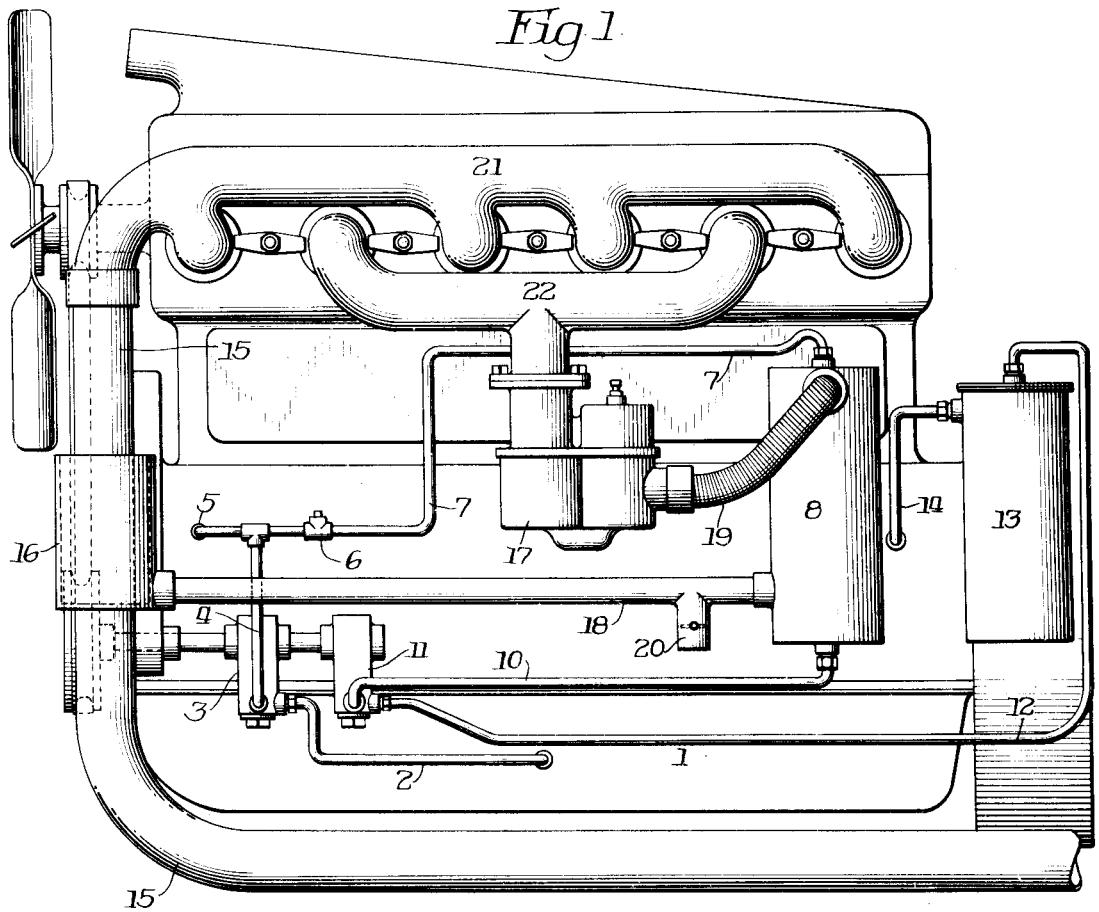
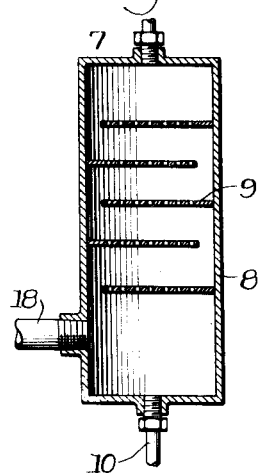
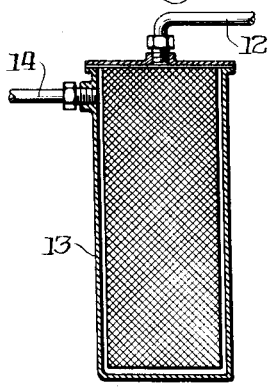

1,907,706

UNITED STATES PATENT OFFICE

HAROLD V. ATWELL, OF HAMMOND, INDIANA, ASSIGNOR TO STANDARD OIL COMPANY (INDIANA), OF CHICAGO, ILLINOIS, A CORPORATION OF INDIANA

LUBRICATING OIL CONDITIONER

Application filed January 16, 1930. Serial No. 421,115.

The present invention relates to systems for conditioning lubricating oil which is circulated for lubrication of internal combustion engines, and involves also a purifying or cleansing system for air employed in the combustion.

In the operation of internal combustion engines employing circulating systems for the lubricating oil, the oil absorbs a proportion of light hydrocarbons. In automobiles, particularly, the oil absorbs unburned heavy ends of the gasoline vapors which find their way into the crankcase, and as this action continues, the oil is thinned down and loses that viscosity necessary for efficient lubrication. It becomes necessary to change the oil in whole or in part. The necessity for such change is also brought about by an accumulation of dirt and carbon in the oil, the dirt being frequently of an abradant character entering the motor with the air. The accumulation of diluent in the oil takes place gradually and is partially offset by evaporation from the crankcase, depending on the temperature of the crankcase, breathing, etc.

Numerous schemes have been devised for dealing with the dilution problem, such as prediluting abnormally high viscosity oil or continuously rectifying the circulating oil by heat from the exhaust to drive out the more volatile constituents.

Much of the wear on pistons, cylinders and bearings may be traced to the introduction of dirt and dust with the air used for combustion. Some of the dirt is carried continuously by the oil as it is recirculated and the abrading action will become greater, the longer the oil is used. Air cleaners and oil filters have been employed to minimize accumulation of dirt in the oil.

The present invention offers a new solution for both problems. The invention provides a preheater for air, a scrubber for treating oil by the preheated air, and a separator to remove dirt from the oil before returning it to the engine.

It is one object of the invention to use heated air for evaporating volatile constituents from the lubricating oil.

Another object of the invention is to scrub the air for combustion to remove dirt therein.

A more specific object of the invention is to scrub preheated air with lubricating oil, then to filter the oil and return the same to the lubricating system of the motor.

Various other objects and advantages will be apparent from the following description of the exemplary embodiment of the invention which is shown in the accompanying drawing in which is represented more or less diagrammatically an automobile engine equipped with a device embodying the invention.

The invention is, of course, not to be considered as limited to the disclosure and description herein contained. It is to be understood that modifications and other constructions are contemplated, such as may fall within the scope of the appended claims.

The invention may be readily understood by referring to the accompanying drawing in which—

Figure 1 is a side elevation of a gasoline engine,

Figure 2 is a cross-sectional view of the air scrubbing chamber, and

Figure 3 is a cross-sectional view of the oil filter.

Referring more specifically to Fig. 1, 21 is the exhaust manifold of a gasoline engine of the type used in automobiles. The intake manifold is designated by the number 22, the carburetor by 17, and the exhaust pipe by 15. Numerals 3 and 11 indicate lubricating oil pumps and numeral 16 indicates an air preheater. Numeral 8 is used to designate an air scrubber which is shown in section in Fig. 2. The oil filter 13 may be of the conventional type containing a screen and filter sack as shown in section in Fig. 3.

In operation, oil is drawn from the crankcase 1 through line 2 by pump 3 which forces the oil through line 4 to the bearings, within the engine, connection to which is made at 5. A portion of the oil flowing through line 4 is permitted to escape through release valve 6 into line 7, leading to the upper part of air scrubber 8. The oil flows downwardly through the scrubber where it is brought into intimate contact with an upward current of air by means of baffles 9. From the bottom of the scrubber, it flows by line 10 to pump 11 by which it is forced through line 12 and filter 13. The clean, filtered oil is returned to the crankcase by line 14.

Surrounding the exhaust pipe 15, is a chamber 16 which serves to heat the air used by the carburetor 17. Heated air is drawn through the pipe 18 to the lower part of the scrubber 8, thence out near the top and to the carburetor by pipe 19. The heated air passing through the scrubber in contact with the oil therein, is washed free of its suspended dust particles and, at the same time, serves to evaporate volatile hydrocarbons, water, etc., from the oil. Any hydrocarbon vapors removed from the oil in this way are consumed in the engine.

In warm weather, it is not necessary to heat the air going to the scrubber to the same extent as in cold weather. Accordingly, by-pass valve 20 is provided to permit air being drawn directly to the scrubber when desired.

The air cleaners commonly used on automobile gasoline engines which seek to remove abrasive material from the air taken into the carburetor by centrifugal action have not been effective for the reason that much of the dust is very finely divided, and is carried through the cleaner. In my cleaner, the dust particles are brought in contact with oil which wets them and effectively removes them from the air.

The oil with the contained dust particles can be filtered more readily than is the case when the oil is passed directly from the crankcase to the filter. The dust particles are a distinct aid to filtration which is ordinarily rather difficult because of the slimy nature of the carbon and asphaltic matter which forms in the oil. Consequently, the oil obtained from my improved filtration operation contains less asphaltic matter and carbon than is the case with oil filters operating without the dust filter aid.

I have described my invention as applied to a certain form of apparatus, but it is not intended that it be limited by these illustrations except as defined in the following claims.

I claim:

1. A conditioner for lubricating oil in an internal combustion engine which comprises in combination an oil supply for lubrication of the engine, an oil pump, a scrubber connected to said pump for receiving oil, said scrubber being adapted to produce scrubbing contact between air and oil, means for countercurrently supplying heated air to said scrubber for passage therethrough to volatilize undesirable constituents from the oil, means for filtering solid particles from the scrubbed oil, and means to return the treated oil to the engine.

2. A conditioner for lubricating oil in an internal combustion engine which comprises in combination an oil supply for lubrication of the engine, an oil pump, a scrubber connected to said pump for receiving oil, said scrubber being adapted to produce scrubbing contact between air and oil, means to supply heated air to said scrubber for passage therethrough to volatilize undesirable constituents of the oil, a filter, means to force oil from the scrubber through the filter, and means to return the filtered oil to the engine.

3. A conditioner for lubricating oil in an internal combustion engine which comprises in combination means to circulate oil under pressure, an air scrubber connected to said pressure supply of oil by means of a bypass valve, and adapted to produce scrubbing contact between air and oil, means for supplying dust laden air to said scrubber to volatilize undesirable constituents of the oil, means to filter the oil from the scrubber to remove dust and asphalt therefrom, and means to return the filtered oil to the engine.

4. The method of conditioning oil for lubrication of an internal combustion engine having a system of circulating oil which comprises by-passing a portion of the oil, subjecting said portion of oil to the countercurrent scrubbing action of dust laden air then filtering the dust from said oil, and returning the filtered oil to the engine.

5. The method of conditioning oil for lubrication of an internal combustion engine which comprises withdrawing oil from the engine, subjecting the oil to the countercurrent scrubbing action of preheated air, subsequently filtering the oil, returning the oil to the engine, and passing the air directly to the carburetor of the engine fuel system.

6. In a gasoline engine lubricating oil conditioner, the combination of means for continuously withdrawing a portion of the oil from the lubricating system, means for bringing this oil in countercurrent contact with intake air, whereby volatile constituents are removed from the oil and dust particles are removed from the air, and means for filtering the dust particles from the oil before returning it to the engine lubricating system.

7. A conditioner for lubricating oil in an internal combustion engine which comprises in combination an oil supply for lubrication of the engine, a system for circulating oil to and from said supply and to the moving parts of the engine, means for passing an independent stream of oil from the oil supply to a scrubber where it is brought into contact with air to volatilize undesirable constituents from the oil, an oil scrubber, a pump for forcing the scrubbed oil through a filter to remove suspended impurities and returning the filtered oil to the oil supply.

8. A conditioner for lubricating oil in an internal combustion engine which comprises in combination, a lubricating system by which oil is circulated under pressure, a scrubber connected to said lubricating system whereby dust laden intake air is brought into countercurrent scrubbing contact with said lubricating oil without materially restricting the air flow therethrough to volatilize a part of the constituents of the oil, means for filtering the dust and occluded asphaltic material from the oil, means for returning the lubricating oil to the system, and means for passing the scrubbed air to the carburetor of the engine.

9. The method of conditioning air for lubrication of an internal combustion engine which comprises withdrawing used oil from the engine, subjecting the oil to the countercurrent scrubbing action of dust laden air whereby dust particles are accumulated in the oil, then filtering the oil to remove the asphalt and dust particles and returning the filtered oil to the engine.

10. The method of lubricating a gasoline engine, comprising withdrawing used oil from the lubricating system, countercurrently contacting this oil with dust laden intake air, subsequently filtering the oil from the dust and occluded asphaltic materials and returning the filtered oil to the lubricating system where it is employed in the bearings and other moving parts of the engine.

11. The process of removing dust and abrasive solids from the intake air of an automobile gasoline engine and simultaneously removing undesirable diluents from the lubricating oil, comprising countercurrently contacting the intake dust laden air with a stream of lubricating oil in a scrubbing chamber, and subsequently filtering the oil with the aid of the dust removed from the intake air.

12. The method of removing very fine abrasive material and carbon particles from gasoline engine lubricating oil, which comprises countercurrently contacting the oil with intake air containing dust particles which collect in the oil and assist in its filtration, and subsequently filtering said dust containing oil.

13. The method for conditioning lubricating oil of an internal combustion engine, which comprises withdrawing a portion of the oil from the lubrication system, subjecting the oil to the scrubbing action of dust laden air whereby dust particles accumulate in the oil and assist in its subsequent filtration, filtering said dust containing oil and returning the filtered oil to the lubrication system.

Signed this 10th day of January, 1930, at Chicago, county of Cook, State of Illinois.

HAROLD V. ATWELL.